US009816287B2

(12) United States Patent
Zhou et al.

(10) Patent No.: US 9,816,287 B2
(45) Date of Patent: Nov. 14, 2017

(54) UPDATING CALIBRATION OF A THREE-DIMENSIONAL MEASUREMENT SYSTEM

(71) Applicant: CyberOptics Corporation, Golden Valley, MN (US)

(72) Inventors: Guangyu Zhou, Sunnyvale, CA (US); Eric P. Rudd, Hopkins, MN (US); Carl E. Haugan, St. Paul, MN (US)

(73) Assignee: CyberOptics Corporation, Golden Valley, MN (US)

( * ) Notice: Subject to any disclaimer, the term of this patent is extended or adjusted under 35 U.S.C. 154(b) by 0 days.

(21) Appl. No.: 14/976,631

(22) Filed: Dec. 21, 2015

(65) Prior Publication Data

US 2016/0180511 A1    Jun. 23, 2016

Related U.S. Application Data (60) Provisional application No. 62/095,329, filed on Dec. 22, 2014.

(51) Int. Cl.
*H04N 17/00* (2006.01)
*H04N 17/02* (2006.01)
(Continued)

(52) U.S. Cl.
CPC .......... *E04H 17/04* (2013.01); *B29C 65/103* (2013.01); *B29C 66/1122* (2013.01);
(Continued)

(58) Field of Classification Search
USPC ..... 348/187, 180, 211.14, 231.1, 231.9, 237, 348/309, 333.1, 333.09, 523, 567, 659, 348/714, 744, 745, 42, 46, 47, 48, 73, 94, 348/95, 130, 135, 136, 137, 139, 142, 348/153, 156, 159; 345/419, 426, 633, 345/634, 644; 382/106, 154, 275, 276,
(Continued)

(56) References Cited

U.S. PATENT DOCUMENTS

| 6,044,204 A * | 3/2000 | Takamatsu | G06K 15/14 358/1.9 |
| 7,418,364 B1 * | 8/2008 | Horton | G01C 21/16 702/151 |

(Continued)

OTHER PUBLICATIONS

International Search Report and Written Opinion for International Application No. PCT/US2015/067051, dated Apr. 14, 2016, date of filing: Dec. 21, 2015, 11 pages.

(Continued)

*Primary Examiner* — Jefferey F Harold
*Assistant Examiner* — Mustafizur Rahman
(74) *Attorney, Agent, or Firm* — Christopher R. Christenson; Kelly, Holt & Christenson PLLC (57) ABSTRACT

A method of calibrating a three-dimensional measurement system having a plurality of cameras and at least one projector is provided. The method includes performing a full calibration for each camera/projector pair where the full calibration generates at least two sets of correction matrices. Subsequently, an updated calibration is performed for each camera/projector pair. The updated calibration changes less than all of the sets of correction matrices.

20 Claims, 8 Drawing Sheets

(51) Int. Cl.

| | |
|---|---|
| *E04H 17/04* | (2006.01) |
| *E04H 17/16* | (2006.01) |
| *H04N 9/31* | (2006.01) |
| *H04N 9/67* | (2006.01) |
| *B29C 65/10* | (2006.01) |
| *B29C 65/00* | (2006.01) |
| *B29L 31/00* | (2006.01) |
| *B29L 28/00* | (2006.01) |
| *B29C 65/14* | (2006.01) |
| *B29C 65/48* | (2006.01) |
| *B29C 65/62* | (2006.01) |
| *B29C 35/04* | (2006.01) |
| *B29C 65/52* | (2006.01) |
| *B29C 35/08* | (2006.01) |

(52) U.S. Cl.
CPC .......... *B29C 66/304* (2013.01); *B29C 66/472* (2013.01); *B29C 66/723* (2013.01); *B29C 66/81465* (2013.01); *B29C 66/83411* (2013.01); *E04H 17/163* (2013.01); *H04N 9/3185* (2013.01); *H04N 9/3194* (2013.01); *H04N 9/67* (2013.01); *B29C 65/1412* (2013.01); *B29C 65/1425* (2013.01); *B29C 65/483* (2013.01); *B29C 65/4815* (2013.01); *B29C 65/522* (2013.01); *B29C 65/62* (2013.01); *B29C 66/431* (2013.01); *B29C 66/71* (2013.01); *B29C 66/712* (2013.01); *B29C 66/729* (2013.01); *B29C 66/742* (2013.01); *B29C 66/919* (2013.01); *B29C 66/92451* (2013.01); *B29C 66/949* (2013.01); *B29C 66/9441* (2013.01); *B29C 66/9534* (2013.01); *B29C 2035/046* (2013.01); *B29C 2035/0822* (2013.01); *B29C 2035/0855* (2013.01); *B29L 2028/00* (2013.01); *B29L 2031/73* (2013.01)

(58) Field of Classification Search
USPC ........ 382/286, 293, 294, 295, 296; 702/151, 702/152, 155, 156
See application file for complete search history.

(56) References Cited

U.S. PATENT DOCUMENTS

| | | | | |
|---|---|---|---|---|
| 7,660,588 B2* | 2/2010 | Sheynblat | ............. | G01S 5/0263 455/456.1 |
| 9,161,015 B2* | 10/2015 | Myokan | ............. | H04N 13/0022 |
| 2003/0193566 A1* | 10/2003 | Matsuda | ................. | H04N 5/74 348/189 |
| 2003/0202691 A1 | 10/2003 | Beardsley | | |
| 2004/0085939 A1* | 5/2004 | Wallace | ............... | H04B 7/0421 370/335 |
| 2005/0089213 A1* | 4/2005 | Geng | ................. | G06K 9/00214 382/154 |
| 2005/0103351 A1* | 5/2005 | Stomberg | ............... | A61N 1/025 128/898 |
| 2005/0225684 A1* | 10/2005 | George | .................... | H04N 9/31 348/807 |
| 2005/0271299 A1* | 12/2005 | Ajito | ........................ | G06T 3/005 382/293 |
| 2007/0104361 A1* | 5/2007 | Alexander | ............. | G06K 9/209 382/154 |
| 2007/0120855 A1* | 5/2007 | Kondo | ................... | G06K 9/4609 345/426 |
| 2007/0146742 A1* | 6/2007 | Klassen | ............... | H04N 1/6033 358/1.9 |
| 2008/0101725 A1* | 5/2008 | Lin | ...................... | G06K 9/3216 382/286 |
| 2008/0181486 A1* | 7/2008 | Spooner | ................ | G06T 7/0065 382/154 |
| 2008/0239344 A1* | 10/2008 | Wang | .................... | B41J 29/393 358/1.9 |
| 2011/0205355 A1* | 8/2011 | Liu | ....................... | G06T 7/0018 348/135 |
| 2011/0316980 A1* | 12/2011 | Dubbelman | ......... | G06K 9/6211 348/47 |
| 2012/0030721 A1* | 2/2012 | Smith | ..................... | H04N 5/782 725/88 |
| 2012/0115509 A1* | 5/2012 | Sheynblat | ............ | G01S 5/0263 455/456.1 |
| 2012/0154694 A1* | 6/2012 | Nishihata | ............. | H04N 9/3144 348/744 |
| 2012/0300044 A1* | 11/2012 | Thomas | ................ | G06T 7/0042 348/51 |
| 2013/0002832 A1* | 1/2013 | Lasenby | ............... | A61B 5/0064 348/51 |
| 2013/0046506 A1* | 2/2013 | Takabayashi | ......... | G06T 7/0018 702/155 |
| 2013/0076789 A1 | 3/2013 | Majumder et al. | | |
| 2013/0083171 A1* | 4/2013 | Habuka | ................... | G06T 5/003 348/47 |
| 2013/0100282 A1* | 4/2013 | Siercks | ............. | G01B 11/2513 348/135 |
| 2013/0293684 A1* | 11/2013 | Becker | ................ | G01B 11/245 348/47 |
| 2013/0293701 A1* | 11/2013 | Tani | ....................... | G01C 11/02 348/135 |
| 2014/0028805 A1* | 1/2014 | Tohme | ................. | G01C 15/002 348/47 |
| 2014/0098191 A1* | 4/2014 | Rime | .................... | H04N 5/2254 348/46 |
| 2014/0118579 A1* | 5/2014 | Kim | ........................ | H04N 9/045 348/242 |
| 2014/0168379 A1* | 6/2014 | Heidemann | ........ | G01B 11/2513 348/47 |
| 2014/0240587 A1* | 8/2014 | Cote | .................... | H04N 5/2256 348/371 |
| 2014/0268093 A1* | 9/2014 | Tohme | .................. | G01S 17/003 356/3.08 |
| 2015/0124055 A1* | 5/2015 | Kotake | .............. | H04N 13/0246 348/46 |
| 2015/0178908 A1* | 6/2015 | Jesenko | .................. | G06T 7/003 433/29 |
| 2015/0208041 A1* | 7/2015 | Wang | ..................... | H04N 7/183 348/148 |
| 2015/0260845 A1* | 9/2015 | Takemura | ............. | G01S 7/4815 356/3.11 |
| 2015/0269451 A1* | 9/2015 | Seki | ................... | G06K 9/00805 382/104 |
| 2015/0310728 A1* | 10/2015 | Calabrese | ......... | H04M 1/72527 340/539.11 |
| 2015/0363265 A1* | 12/2015 | Liu | ..................... | G06F 11/1068 714/764 |
| 2016/0117820 A1* | 4/2016 | Oh | ......................... | G06T 7/0028 348/47 |

OTHER PUBLICATIONS

International Preliminary Report on Patentability for International Patent Application No. PCT/US2015/067051, dated Jul. 6, 2017, 10 pages.
Search Report and Written Opinion for International Patent Application No. PCT/2015/067051 dated Apr. 14, 2016, 11 pages.

* cited by examiner

UPDATING CALIBRATION OF A THREE-DIMENSIONAL MEASUREMENT SYSTEM

CROSS-REFERENCE TO RELATED APPLICATIONS

The present application is based on and claims the benefit of U.S. Provisional Patent Application Ser. No. 62/095,329, filed Dec. 22, 2014, the content of which is hereby incorporated by reference in its entirety.

COPYRIGHT RESERVATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Automatically obtaining precision three dimensional information relative to a surface or object is vital to many industries and processes. For example, in the electronics assembly industry, precision three-dimensional information relative to an electrical component on a circuit board can be used to determine whether the component is placed properly. Further, three-dimensional information is also useful in the inspection of solder paste deposits on a circuit board prior to component mounting in order to ensure that a proper amount of solder paste is deposited in the proper location on the circuit board. Further still, three-dimensional information is also useful in the inspection of semiconductor wafers and flat panel display. Finally, as the precision of such three-dimensional information improves, it is becoming useful for a variety of additional industries and applications. However, as the precision of the three-dimensional information acquisition improves, it becomes more and more important to compensate for the various causes of minor system disturbances. Calibration of systems for obtaining three-dimensional is thus becoming increasingly important.

The calibration process for a three-dimensional structured light measurement sensor should compensate the projectors and cameras for the usual optical non-idealities, including lens geometric distortion, obliquity/keystone effects, rotation errors, and line of sight errors. Some of these non-idealities will not change appreciably over time to affect the measurement accuracy. However, following a sensor calibration, other non-idealities may drift appreciably over the time period of minutes to days and will affect measurement performance For example, line of sight may change appreciably due to thermal expansion from environmental changes.

Sophisticated, methods exist to accurately calibrate three-dimensional sensors and typically require precision equipment such as motion systems and calibration artifacts. It is also relatively time-consuming to acquire the necessary images of calibration artifacts and analyze them.

SUMMARY

A method of calibrating a three-dimensional measurement system having a plurality of cameras and at least one projector is provided. The method includes performing a full calibration for each camera/projector pair where the full calibration generates at least two sets of correction matrices. Subsequently, an updated calibration is performed for each camera/projector pair. The updated calibration changes less than all of the sets of correction matrices.

DETAILED DESCRIPTION OF ILLUSTRATIVE EMBODIMENTS

In accordance with the various embodiments described herein, a precise, full calibration process is provided that compensates for the usual non-idealities, facilitates fast run-time processing, and generates a set of reference data that can be subsequently applied to measure calibration drift. This full calibration, while time-consuming, need only be performed once, or at least, infrequently, since it will compensate for non-idealities that will not change appreciably over time. Also in accordance with embodiments described herein, a calibration update process is provided that measures the amount of calibration drift, and, if required, updates only those portions of the full calibration that are expected to drift over time. The calibration update process is a relatively quick process to perform and requires only a relatively simple calibration artifact.

For each camera and projector pair, the full calibration process generates two sets of corrections for each X, Y, and Z direction that are then applied during the measurement process. The first set of corrections includes calibration corrections that may drift over shorter time intervals, for example, on the order of minutes or a couple of days. The second set of corrections includes calibration corrections that may drift over longer time intervals, for example, on the order of several months, or never. These first set of corrections are those that are updated by the calibration update process and the second set of corrections are only updated during subsequent full calibrations.

Figure 1:
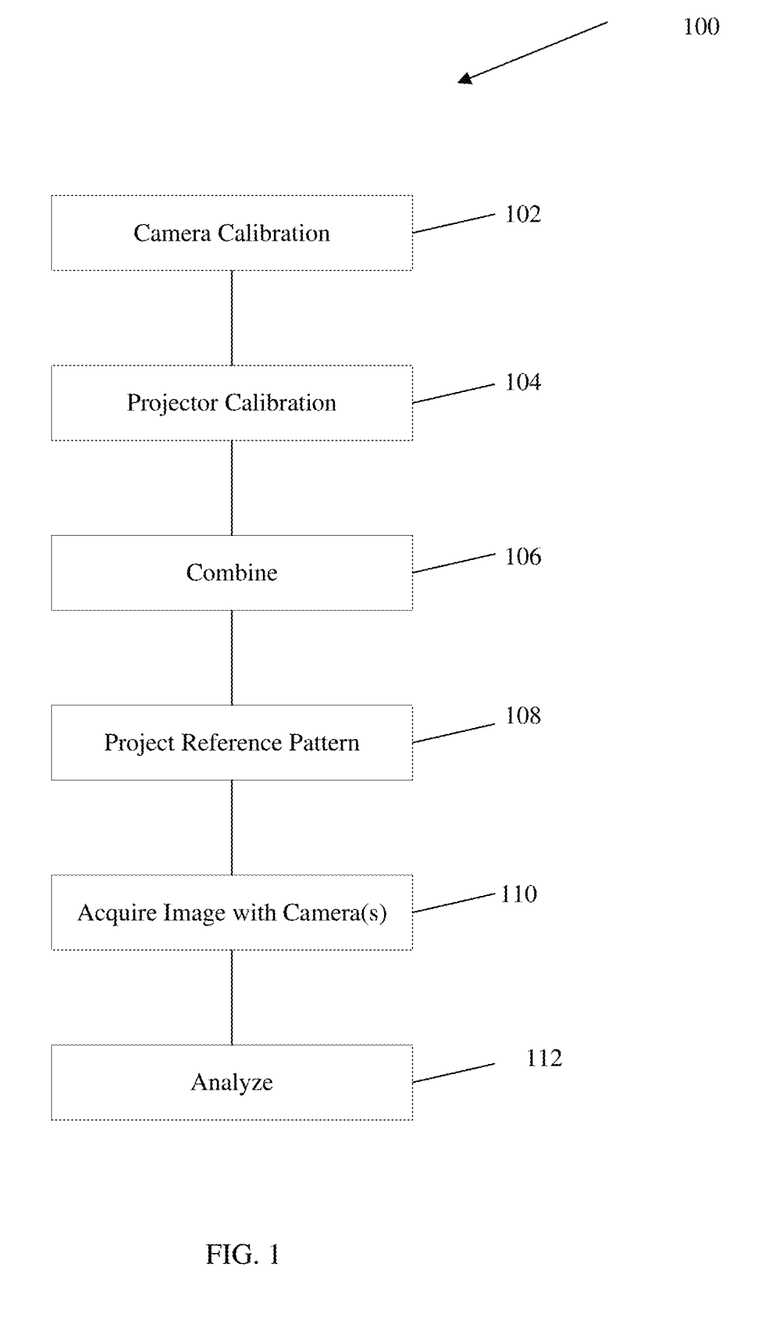
FIG. 1 is a flow diagram of a method for performing a full calibration in accordance with an embodiment of the present invention.
Figure 2:
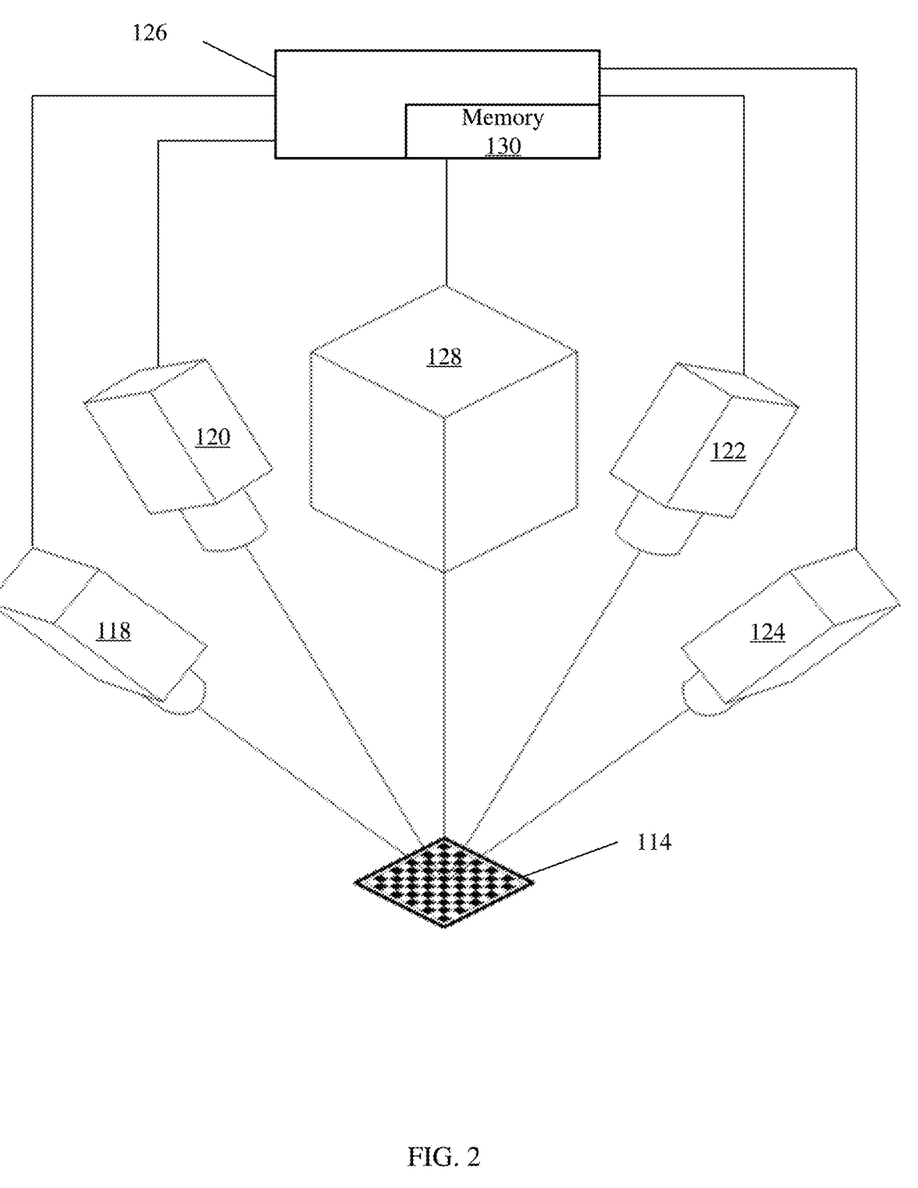
FIG. 2 is a diagrammatic view illustrating a full calibration process in accordance with an embodiment of the present invention.

FIG. 1 is a flow diagram of a method for performing a full calibration of the three-dimensional measurement system shown in FIG. 2. Note, while subsequent figures depicting the three-dimensional measurement system may not show all components indicated in FIG. 2, such omission is not indicative of the absence of such components. Instead, such figures are simplified for clarity of description.

Figure 7:
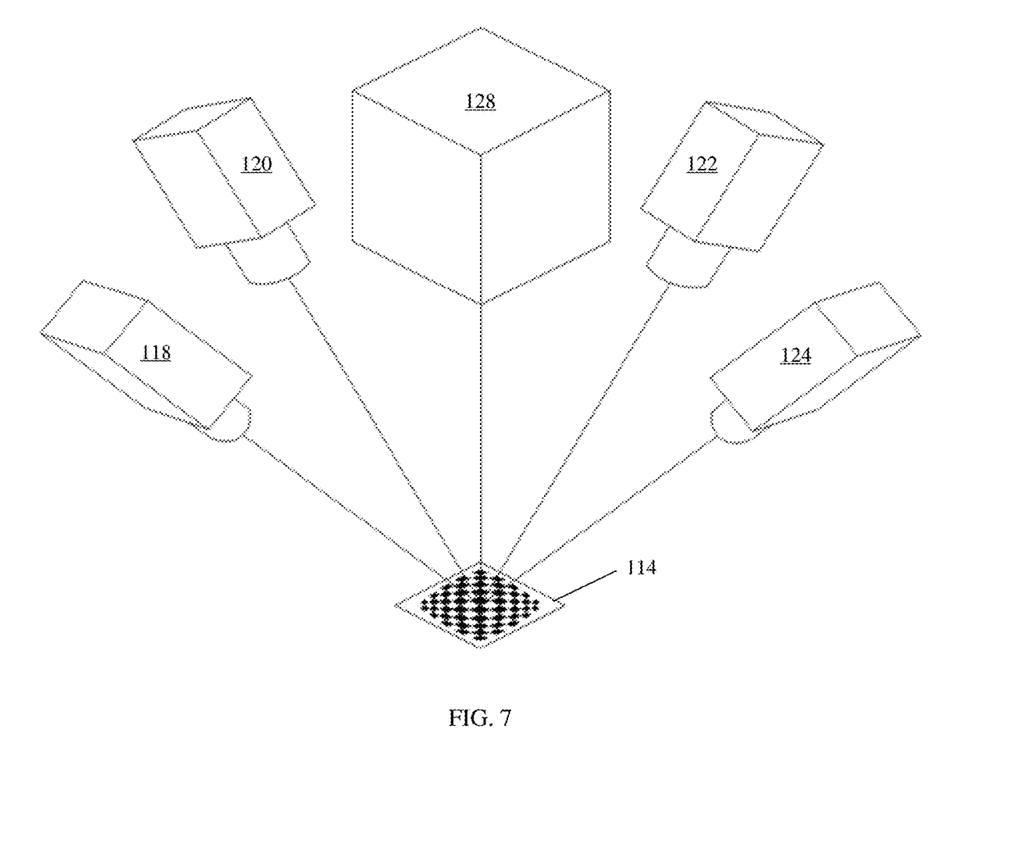
FIG. 7 is a diagrammatic view of a reference pattern projected onto a projector calibration target in accordance with an embodiment of the present invention.

Method 100 begins at block 102 where a camera calibration is performed. Calibrating the cameras 118, 120, 122, and 124 includes obtaining images of a well-characterized calibration target 114 (shown in FIG. 2) where the images are acquired while the calibration target 114 is located at a range of different height (z) positions for which the calibration is desired (shown in FIG. 4). Those images are analyzed by controller 126 or other suitable processing logic to establish the geometrical transformation between camera pixel space and physical space. Next, at block 104, a projector calibration is performed where a pattern is projected onto either the same target 114 or another target and each camera takes images of the pattern through the z range. Those images are analyzed by controller 126 or other suitable processing logic to establish the geometrical transformation between camera pixel space and source-pattern space. Block 104 is repeated for each projector 128 in the system. Note, in the example shown in FIG. 2, a single projector 128 is shown. Next, at block 106, the process inverts and controller 126 or other suitable processing logic combines the camera and projector transformations so as to produce an overall calibration for each camera and projector pair. Thus, if there were two cameras and four projectors, there would be eight sets of full calibration data; one set for each projector/camera pair. Next, at block 108, a reference pattern is projected onto a target. An example of the reference pattern is shown in FIG. 7. At block 110, each camera 118, 120, 122, and 124 acquires an image of the reference pattern. Those images are analyzed by controller 126 or other suitable processing logic, at block 112, to determine the geometrical transformation between camera pixel space and the reference pattern space.

During the camera calibration process, described with respect to block 102, the images are analyzed by controller 126 or other suitable processing logic to establish the geometrical transformation between pixel space and physical space. During this analysis, the relationship between the X, Y coordinates of the calibration target 114, the camera pixel coordinates, $\alpha$ and $\beta$, and the target location, Z, can be described by Equation 1:

$$(X,Y) = f_1(\alpha,\beta,Z) \qquad \text{Equation 1}$$

The X, Y coordinates are accurately known from the well-characterized calibration target 114 (e.g. lithographically patterned checkerboard or diamond pattern), where the Z location of the calibration target is known accurately, for example using a precision translation stage with encoders, and where $f_1(*)$ is an arbitrary trivariate function.

During the projector calibration process, described with respect to block 104, a series of patterns are projected onto a target and the camera acquires images of the patterns through the z range. For example, three sinusoidal patterns with phases of 0, 120, and 240 degrees may be projected onto the target at each Z location. See FIG. 6. The camera images are analyzed by controller 126 or other suitable processing logic to calculate the phase at each pixel using the standard three image phase retrieval techniques in order to establish the geometrical transformation between pixel space and projector pattern space. During this analysis, the relationship between the calculated phase of the sinusoidal pattern on the target, $\phi$, the camera pixel coordinates, $\alpha$ and $\beta$, and the target location, Z, can be described by Equation 2:

$$\phi = f_2(\alpha,\beta,Z) \qquad \text{Equation 2}$$

The Z location of the calibration target is known accurately, for example, using a precision translation stage with encoders and where $f_2(*)$ is an arbitrary trivariate function.

During the run-time process of reconstructing the X,Y,Z coordinates for each camera pixel, Equations 3 and 4:

$$(X,Y) = f_1(\alpha,\beta,Z) \qquad \text{Equation 3}$$

$$\phi = f_2(\alpha,\beta,Z) \qquad \text{Equation 4}$$

are intractable for reconstruction because Z is an independent variable, yet it is also an unknown. Instead, the functions must be provided of the form of Equation 5:

$$(X,Y,Z) = f_3(\alpha,\beta,\phi) \qquad \text{Equation 5}$$

An important insight that facilitates a practical reconstruction is that for any pixel of a given calibration image, one can associate the quantities (X, Y, Z, $\alpha$, $\beta$, $\phi$) without any assumptions about the functional forms. From a suitably-large set of such sextuplets, one can re-assign the independent and dependent variables by regression, with trivariate polynomials being a suitable fitting function. Thus, one computes the height Z by:

$$Z = (\text{wrap height}) * \phi_c / 2\pi \qquad \text{Equation 6}$$

where wrap height is the nominal scaling from phase $\phi_c$ to height Z, the corrected phase is:

$$\phi_c = P(\alpha,\beta,\phi) \qquad \text{Equation 7}$$

and the corrected lateral positions X and Y by:

$$X = Q_1(\alpha,\beta,\phi) \qquad \text{Equation 8}$$

$$Y = Q_2(\alpha,\beta,\phi) \qquad \text{Equation 9}$$

P(·), Q1(·), and Q2(·) are trivariate polynomials found by the regressions. The regressions may be done once at calibration time, with the results stored in memory 130 of controller 126 or any other suitable memory for later application at runtime.

There are several advantages of this approach. One advantage is that telecentricity does not cause singularities or require special cases in the treatment, as it does for processes that rely on determination of an effective pupil height. Instead, the associated correction coefficients are very small or zero. Another advantage is that pupil distortions are automatically modeled and accounted for. Yet another advantage is that the rectification may be applied using only multiplications and additions, which facilitates high-speed processing; no divisions or iterations are required.

To facilitate the calibration update process, the full calibration process generates two sets of corrections for each X, Y, and Z direction and a set of reference data. When sinusoidal phase-shifted patterns are used for reconstruction, then the Z position is directly proportional to the corrected phase. In one embodiment, the first set of phase corrections are offset corrections relative to a reference plane at nominal best focus (Z=0) and the second set of phase corrections are scaling factors to account for fringe direction and changes in triangulation angle across the field of view. The first set of X corrections are offset corrections at nominal best focus (Z=0) and the second set of corrections characterize the X shifts through the working volume Similarly for the Y corrections, the first set of Y corrections are offset corrections at nominal best focus (Z=0) and the second set of corrections characterize the Y shifts through the working volume. Additionally, the full calibration process generates several sets of reference data that are used during the calibration update process.

More specifically, the corrected phase, $\phi_c$, is calculated by Equation 10

$$\phi_c = P(\alpha, \beta, \phi) = d\phi_0 + \phi \cdot d\phi_c/d\phi \qquad \text{Equation 10}$$

$\phi_c$, $d\phi_0$, $\phi$, $d\phi_c/d\phi$, are all two-dimensional matrices that match the size of the image. Matching the size of the image means that the matrix has the same number of elements as pixels in the image. Thus, in the example shown above, there are four different matrices, each having the same number of elements as pixels in the image. The first phase correction matrix $d\phi_0$ is the phase offset at Z=0 relative to a flat reference surface for each pixel coordinate $(\alpha, \beta)$ in the image. Each element of the $_4$ matrix is the nominal phase at that pixel location generated by the phase shift method. The second phase correction matrix $d\phi_c/d\phi$ is a unitless matrix that compensates the wrap height of each pixel for fringe direction and triangulation angle changes within the field of view. $\phi \cdot d\phi_c/d\phi$ is the element by element product of the two matrices which is also called the Hadamard product.

The height at each pixel is then given by Equation 11.

$$Z = (\text{wrap height}) * \phi_c / 2\pi \qquad \text{Equation 11}$$

The corrected X location for each pixel is calculated by Equation 12:

$$X = Q_1(\alpha, \beta, \phi) = X_{nom} + dX_0 + \phi \cdot dX/d\phi \qquad \text{Equation 12}$$

where X, $X_{nom}$, $dX_0$, $\phi$, $dX/d\phi$ are all two-dimensional matrices that match the size of the image. Each element of the $X_{nom}$ matrix is the nominal X image coordinate based on pixel coordinate and nominal resolution. The first X correction matrix $dX_0$ is the X offset for each pixel coordinate $(\alpha, \beta)$ in the image that corrects for geometric distortions at Z=0. The second X correction matrix $dX/d\phi$ characterizes lateral shifts as function of nominal phase. $\phi \cdot dX/d\phi$ is the element by element product of the two matrices.

The corrected Y coordinate for each pixel is calculated by a similar process as the X corrections as set forth in Equation 13:

$$Y = Q_2(\alpha, \beta, \phi) = Y_{nom} + dY_0 + \phi \cdot dY/d\phi \qquad \text{Equation 13}$$

where Y, $Y_{nom}$, $dY_0$, $\phi$, $dY/d\phi$ are all two-dimensional matrices that match the size of the image. Each element of the $Y_{nom}$ matrix is the nominal Y image coordinate based on pixel coordinate and nominal resolution. The first Y correction matrix $dY_0$ is the Y offset for each pixel coordinate $(\alpha, \beta)$ in the image that corrects for geometric distortions at Z=0. The second Y correction matrix $dY/d\phi$ characterizes lateral shifts as function of nominal phase. $\phi \cdot dY/d\phi$ is the element by element product of the two matrices.

The full calibration process will be further explained with respect to FIG. 2. Each camera 118, 120, 122, and 124 images the carefully characterized camera calibration target 114. The pattern on the camera calibration target 114 may be a checkerboard pattern (such as in the illustrated example), a diamond pattern, and reference marks may also be patterned on the camera calibration target 114 to unambiguously establish the coordinate system of the camera calibration target 114. In one embodiment, the camera calibration target includes a half-tone pattern in order to establish its coordinate system.

Figure 3A:
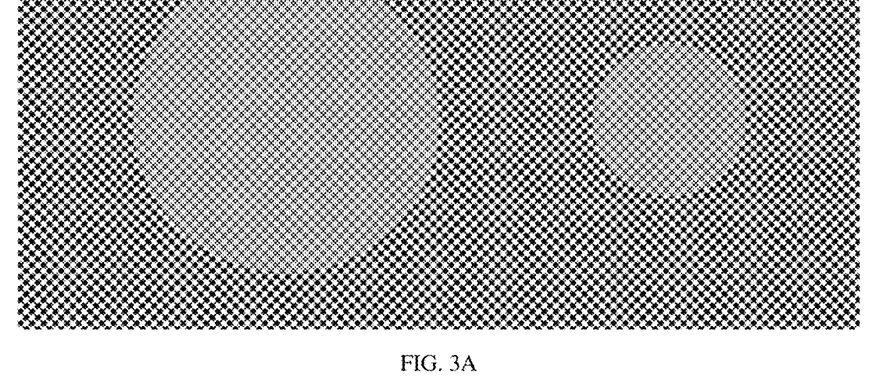
FIG. 3A shows a camera calibration target that includes a checkerboard pattern and two half-toned circles in accordance with an embodiment of the present invention.
Figure 3B:
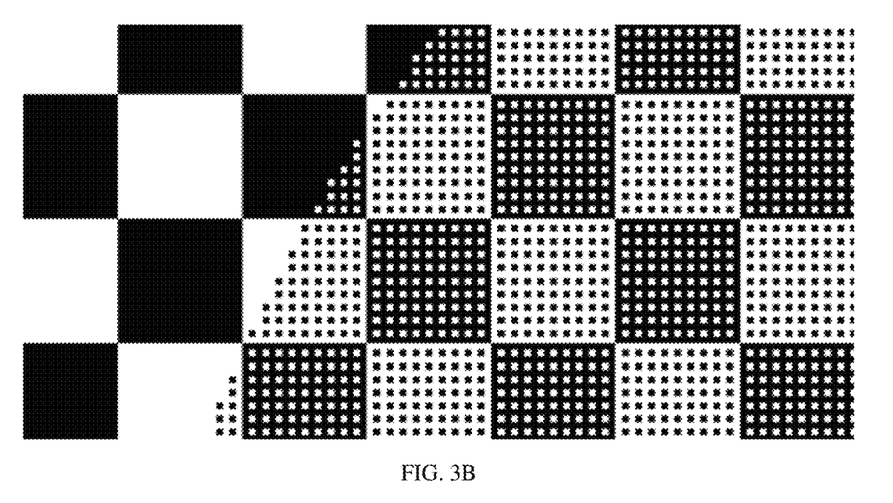
FIG. 3B shows a detailed portion of FIG. 3A.
Figure 4:
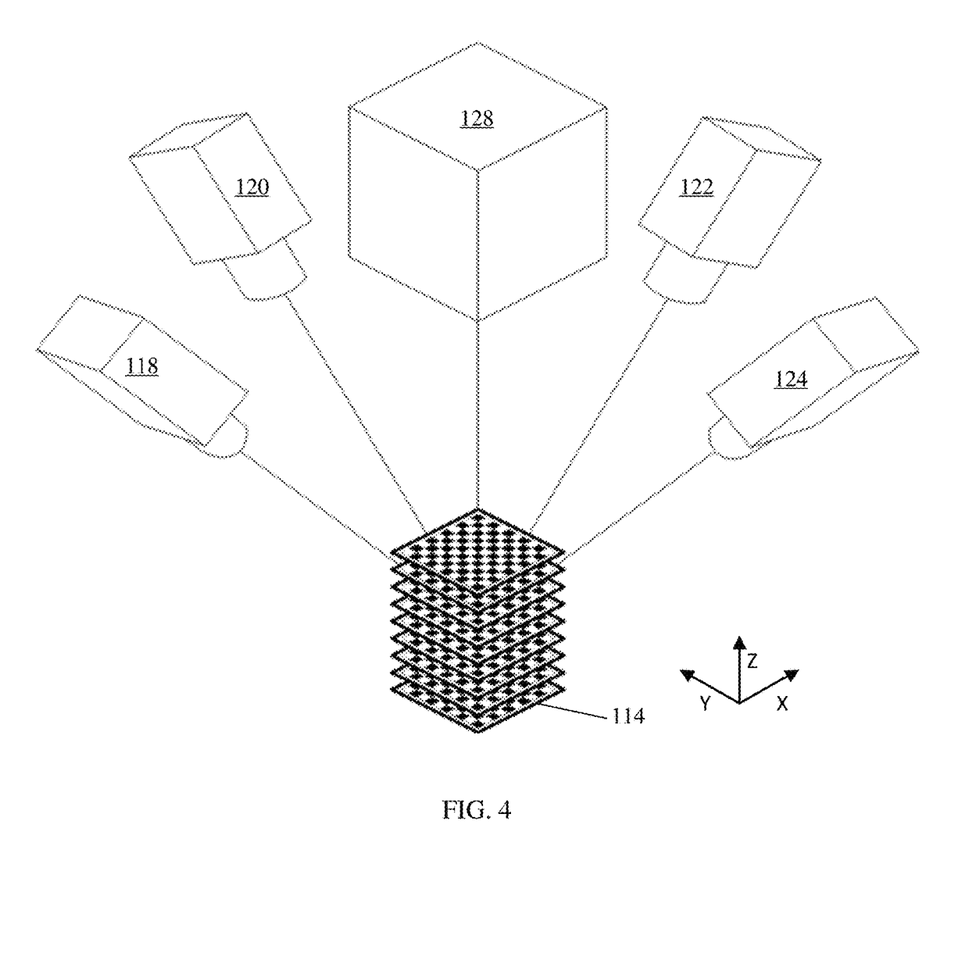
FIG. 4 is a diagrammatic view of several discrete Z locations of the camera calibration target within the measurement volume at which the Z location is recorded in accordance with embodiments of the present invention.

FIG. 3A shows an example of the camera calibration target that includes a checkerboard pattern and two half-toned circles within the checkerboard pattern. The circles establish a common coordinate system for all of the cameras. FIG. 3B shows a detailed portion of FIG. 3A. Each camera image is analyzed by controller 126 or other suitable processing logic to determine the (X,Y) location of the calibration target features for each camera pixel coordinate $(\alpha, \beta)$. The Z location of the camera calibration target 114 is also recorded in memory 130 or other suitable storage. This process is repeated as the camera calibration target 114 is positioned at several discrete Z locations within the measurement volume of the three dimensional sensor as shown in FIG. 4.

Figure 5:
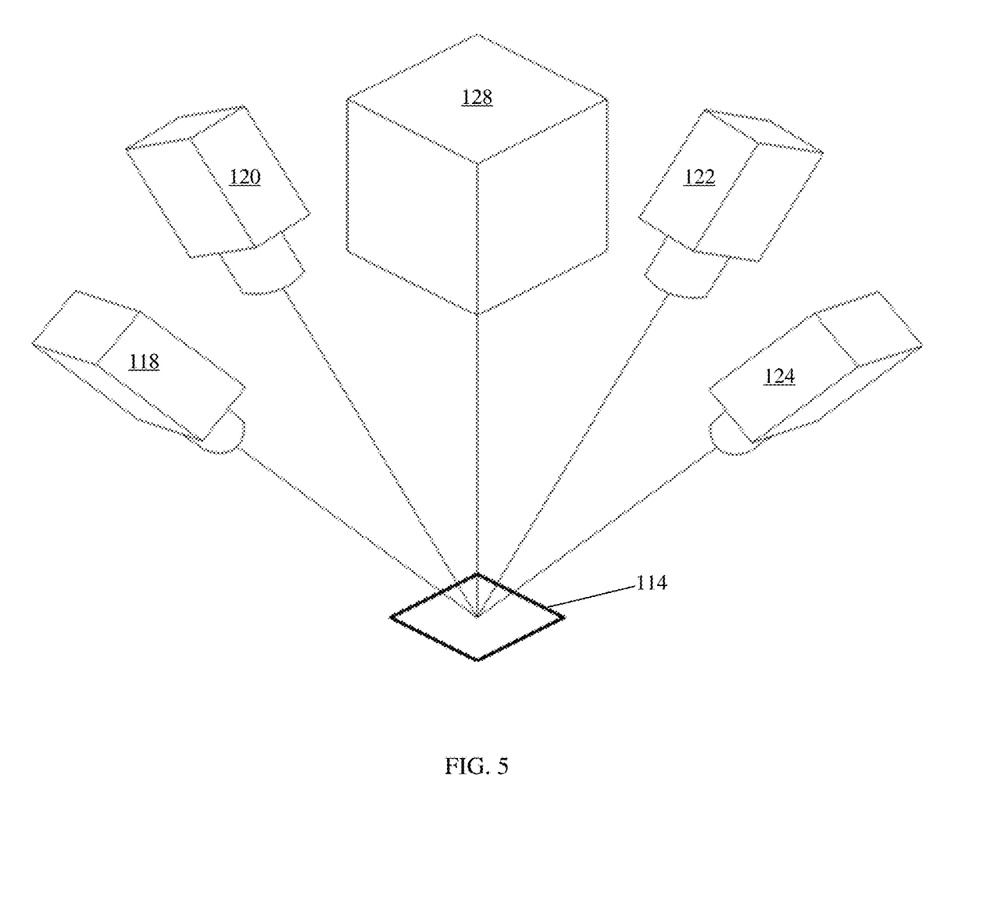
FIG. 5 is a projection calibration target in accordance with an embodiment of the present invention.
Figure 6:
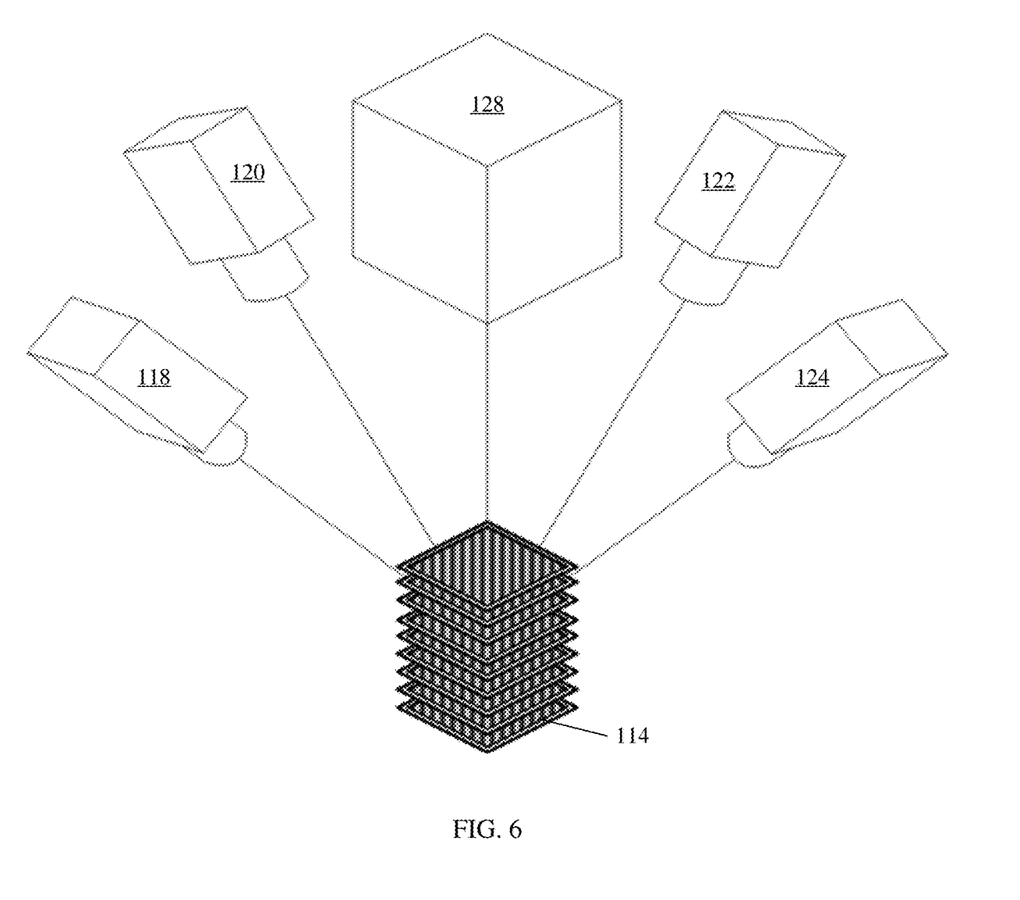
FIG. 6 is a diagrammatic view of a plurality of Z locations at which a series of sinusoidal fringe patterns are projected in accordance with an embodiment of the present invention.

To calibrate the projector 128, the camera calibration target 114 may be replaced by the projector calibration target as shown in FIG. 5. At each Z location of the projector calibration target a series of sinusoidal fringes are projected and imaged by each camera as shown in FIG. 6. The images from each camera are analyzed by controller 126 or other suitable processing logic to calculate the phase at each pixel coordinate $(\alpha, \beta)$.

Reference data for the calibration update process is then generated by projecting a reference pattern onto the projector calibration target located at Z=0 as shown in FIG. 7. The reference pattern images are analyzed to determine the locations of the projected reference pattern features for each camera pixel in the reference pattern coordinate system. The reference pattern coordinate system is assumed to share the physical X, Y coordinate system, but may be slightly distorted due to distortions in the projection optics. A reference X correction matrix $dX_{0,ref}$ is then generated for each camera image that gives the X offset for each pixel, in each image, in the reference pattern coordinate system. Similarly, a reference Y correction matrix $dY_{0,ref}$ is generated for each camera image that gives the Y offset for each pixel, in each image, in the reference pattern coordinate system. Although only one projector is shown in FIGS. 2-6, the three dimensional sensor system may have more than one projector in other embodiments. In those embodiments, first and second sets of X, Y and phase correction matrices and reference X and Y correction matrices are generated for each camera and projector pair.

In another embodiment, the same target is used for both camera calibration and the projector calibration. For camera calibration, the target may be illuminated by diffuse back lighting to view the camera calibration pattern. The surface of this target may be also slightly roughened so that it diffusely scatters light when it is illuminated from the front by the projector.

Figure 8:
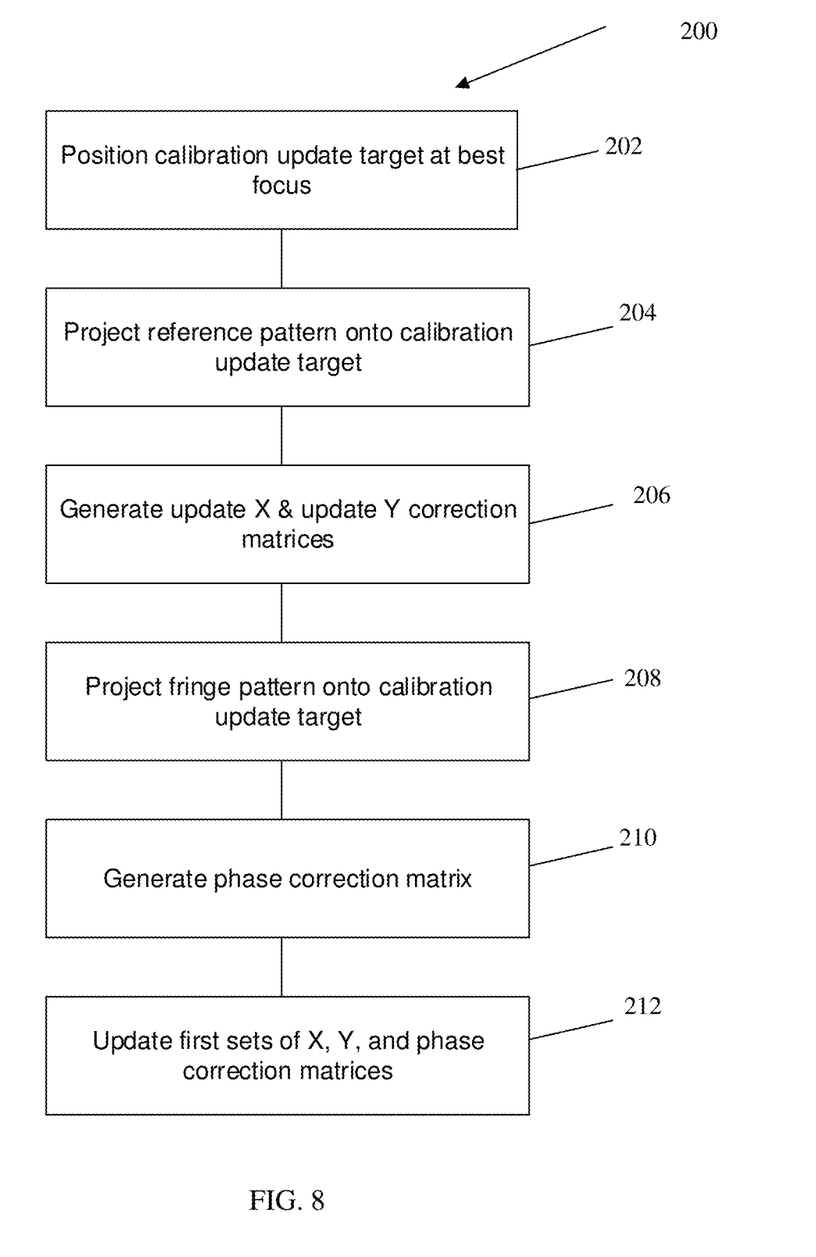
FIG. 8 is a flow diagram of a method of updating a calibration in accordance with an embodiment of the present invention.

After the full calibration process is complete, the calibration update process may be performed relatively quickly whenever required by adjusting the relative position of a calibration update target at Z=0, the nominal best focus of the sensor. FIG. 8 is a flow diagram of a method of updating a calibration in accordance with an embodiment of the present invention. Method 200 begins at block 202 where a calibration update target is positioned at a location of best focus. In one embodiment, the calibration update target is preferably a planar surface. At block 204, the same reference pattern that was used to generate the reference X and reference Y correction matrices during the full calibration process is projected onto the calibration update target. At block 206, X and Y correction matrices are updated. More particularly, an update X correction matrix $dX_{0,upd}$ is generated for each camera image that gives the X offset for each pixel, in each image, in the reference pattern coordinate system. Similarly, an update Y correction matrix $dY_{0,upd}$ is generated for each camera image that gives the Y offset for each pixel, in each image, in the reference pattern coordinate system. At block 208, a set of sinusoidal fringes with the same properties as those used in the full calibration process are then projected onto the calibration update target. At block 210, the phase correction matrix $d\phi_{0,upd}$ is then calculated. The first sets of correction matrices for each camera are then updated, at block 212, by the following relationships $$dX_0 = dX_{0,full} + (dX_{0,upd} - dX_{0,ref})$$ Equation 14

$$dY_0 = dY_{0,full} + (dY_{0,upd} - dY_{0,ref})$$ Equation 15

$$d\phi_0 = d\phi_{0,upd}$$ Equation 16 where $dX_{0,full}$, $dY_{0,full}$ are the first sets of X and Y correction matrices, respectively, generated during the full calibration process. The difference matrices $(dX_{0,upd} - dX_{0,ref})$ and $(dX_{0,upd} - dX_{0,ref})$ are a measure of the calibration drift. Even if there is some distortion of the reference pattern by the projection optics, the same distortion is present during the full calibration and calibration update processes and is canceled by taking the difference of the reference and update correction matrices. If the residuals of these difference matrices are sufficiently low, then the first sets of correction matrices remain those generated during the full calibration process:

$$dX_0 = dX_{0,full}$$

$$dY_0 = dY_{0,full}$$

$$d\phi_0 = d\phi_{0,full}$$

where $d\phi_{0,full}$ is the first phase correction matrix generated during the full calibration process.

A full calibration process has been disclosed that provides first and second sets of calibration corrections. A simple calibration update process has been disclosed that updates the first sets of corrections. In a more general sense, the calibration update process updates only a portion of the full calibration. Although specific patterns have been disclosed for camera, projector, reference, and update calibrations, the invention is not limited to those specific patterns.

Although the present invention has been described with reference to preferred embodiments, workers skilled in the art will recognize that changes may be made in form and detail without departing from the spirit and scope of the invention.

What is claimed is:

1. A method of calibrating a three-dimensional measurement system having a plurality of cameras and at least one projector, the method comprising:
    performing a full calibration for each camera/projector pair, the full calibration generating at least two sets of correction matrices;
    subsequently performing an updated calibration for each camera/projector pair, wherein the updated calibration changes less than all of the sets of correction matrices; and
    wherein the full calibration generates a first set of correction matrices and a second set of correction matrices, and wherein the updated calibration changes the first set of correction matrices while leaving the second set of correction matrices unchanged.

2. The method of claim 1, wherein the updated calibration is performed more frequently than the full calibration.

3. The method of claim 1, wherein the first set of correction matrices includes calibration corrections that drift over relatively short time intervals.

4. The method of claim 3, wherein the short time intervals are less than two days.

5. The method of claim 1, wherein the second set of correction matrices includes calibration corrections that drift over periods of at least several months.

6. The method of claim 1, wherein a set of correction matrices includes corrections in three orthogonal directions.

7. The method of claim 1, wherein performing a full calibration includes performing a camera calibration where each of the cameras acquires images of a well-characterized calibration target at a number of different, known elevations.

8. The method of claim 7, wherein the images acquired by the cameras are analyzed to establish a geometrical transformation between camera pixel space and physical space.

9. The method of claim 1, wherein performing the full calibration includes performing a projector calibration where a pattern is projected onto a target and each camera acquires images of the projected pattern as the target is positioned at a plurality of different heights.

10. The method of claim 9, wherein the images acquired during the projector calibration are analyzed to establish a geometrical transformation between camera pixel space and source-pattern space.

11. The method of claim 1, wherein the full calibration includes a combination of camera and projector transformations to produce an overall calibration for each camera/projector pair.

12. A method of calibrating a three-dimensional measurement system having a plurality of projectors and at least one camera, the method comprising:
    performing a full calibration for each camera/projector pair, the full calibration having at least two sets of correction matrices;
    subsequently performing an updated calibration for each camera/projector pair, wherein the updated calibration changes less than all of the sets of correction matrices; and
    wherein performing a full calibration includes performing a projector calibration where a pattern is projected onto a target and each camera acquires images of the protected pattern as the target is positioned at a plurality of different heights.

13. A three-dimensional optical image acquisition system comprising:
    a plurality of cameras each configured to view a measurement space from a different point of view;
    at least one projector configured to project a pattern onto the measurement space;
    a controller configured to perform a full calibration of the plurality of cameras and the at least one projector to generate a first set of correction matrices and a second set of correction matrices; and
    wherein the controller is configured to perform a calibration update, conducted after the full calibration, wherein the calibration update is conducted relative to each camera/projector pair, and wherein the calibration update affects the first set of correction matrices while leaving the second set of correction matrices unchanged.

14. The system of claim 13, wherein the first and second sets of correction matrices are stored in system memory.

15. The system of claim 14, wherein the first and second sets of correction matrices are accessed to correct a three-dimensional measurement obtained after completion of the calibration update.

16. The system of claim 13. wherein performing a full calibration includes performing a projector calibration where a pattern is projected onto a target and each camera acquires images of the projected pattern as the target is positioned at a plurality of different heights.

17. A three-dimensional optical image acquisition system comprising:

a plurality of cameras each configured to view a measurement space from a different point of view;
at least one projector configured to project a pattern onto the measurement space;
a controller configured to perform a full calibration of the plurality of cameras and the at least one projector to generate at least a first set of correction matrices and a second set of correction matrices;
wherein the controller is configured to perform a calibration update relative to each camera/projector pair, wherein the calibration update affects the first set of correction matrices while leaving the second set of correction values unchanged; and
wherein performing the full calibration includes performing a projector calibration where a pattern is projected onto a target and each camera acquires images of the projected pattern as the target is positioned at a plurality of different heights.

18. The method of claim 17, wherein the images acquired during the projector calibration are analyzed to establish a geometrical transformation between camera pixel space and source-pattern space.

19. The method of claim 17, wherein the first set of correction matrices includes calibration corrections that drift over relatively short time intervals.

20. The method of claim 17, wherein the second set of correction matrices includes calibration corrections that drift over periods of at least several months.

* * * * *